United States Patent
Van Aken et al.

(10) Patent No.: US 7,732,033 B2
(45) Date of Patent: Jun. 8, 2010

(54) SEALANTS FOR STRUCTURAL MEMBER JOINTS AND METHODS OF USING SAME

(75) Inventors: David C. Van Aken, Rolla, MO (US); Yoshihide Kato, Aichi (JP)

(73) Assignee: The Curators of the University of Missouri, Columbia, MO (US)

( * ) Notice: Subject to any disclaimer, the term of this patent is extended or adjusted under 35 U.S.C. 154(b) by 708 days.

(21) Appl. No.: 11/213,444

(22) Filed: Aug. 26, 2005

(65) Prior Publication Data

US 2007/0044406 A1    Mar. 1, 2007

(51) Int. Cl.
*B23K 20/12*   (2006.01)

(52) U.S. Cl. .................. 428/57; 228/112.1; 228/189; 428/53; 428/58

(58) Field of Classification Search .............. 428/57, 428/58, 53; 228/112.1, 189
See application file for complete search history.

(56) References Cited

U.S. PATENT DOCUMENTS

| | | | |
|---|---|---|---|
| 2,650,185 A * | 8/1953 | Larson et al. | 156/310 |
| 3,222,630 A | 12/1965 | Gorman | |
| 3,616,108 A * | 10/1971 | Whitehouse et al. | 428/52 |
| 4,680,913 A | 7/1987 | Geisen et al. | |
| 5,031,822 A | 7/1991 | Humpston et al. | |
| 5,298,092 A | 3/1994 | Schriever | |
| 5,308,794 A | 5/1994 | Tu | |
| 5,378,293 A | 1/1995 | Schriever | |
| 5,382,397 A * | 1/1995 | Turner, Jr. | 264/46.5 |
| 5,411,606 A | 5/1995 | Schriever | |
| 5,415,687 A | 5/1995 | Schriever | |
| 5,460,317 A | 10/1995 | Thomas et al. | |
| 5,468,307 A | 11/1995 | Schriever | |
| 5,472,524 A | 12/1995 | Schriever | |
| 5,487,949 A | 1/1996 | Schriever | |
| 5,551,994 A | 9/1996 | Schriever | |
| 5,873,953 A | 2/1999 | Schriever | |
| 6,045,028 A * | 4/2000 | Martin et al. | 228/112.1 |
| 6,050,475 A | 4/2000 | Kinton et al. | |
| 6,177,189 B1 | 1/2001 | Rawlings et al. | |
| 6,248,184 B1 | 6/2001 | Dull et al. | |
| 6,310,533 B2 | 10/2001 | Coulombier | |
| 6,328,261 B1 * | 12/2001 | Wollaston et al. | 244/132 |
| 6,432,225 B1 | 8/2002 | Schriever | |
| 6,497,922 B2 | 12/2002 | Knight et al. | |
| 6,543,670 B2 | 4/2003 | Mahoney | |

(Continued)

OTHER PUBLICATIONS

"Characterising texture variations in a friction stir welded aluminium alloy", http://www.hkltechnology.com/data/0-FSW-aluminium.pdf, EBSD Application Notes, HKL Technology, Inc., Danbury, CT, (2005), 28-31.

(Continued)

*Primary Examiner*—Brent T O'Hern

(57) ABSTRACT

Thermoplastic sealants and methods for forming a joint, such as a weld joint, between one or more structural members using thermoplastic sealants are provided. The thermoplastic sealants have melting temperatures lower than the melting temperature of at least one of the structural members. The thermoplastic sealants may further include fillers, and are disposed between faying surfaces of the structural members. The sealants can fill the spaces between the structural members to prevent the entry of chemicals, moisture, debris and other substances.

13 Claims, 12 Drawing Sheets

U.S. PATENT DOCUMENTS

| | | |
|---|---|---|
| 6,568,540 B1 | 5/2003 | Holzmann et al. |
| 6,716,892 B1 | 4/2004 | Mori et al. |
| 6,883,699 B2 | 4/2005 | Stevenson et al. |
| 6,892,924 B2 | 5/2005 | Stevenson et al. |
| 6,905,060 B2 | 6/2005 | Van Aken et al. |
| 2002/0006482 A1 | 1/2002 | Falla et al. |
| 2002/0089828 A1 | 7/2002 | Suzuki et al. |
| 2003/0162026 A1* | 8/2003 | Mullins et al. ............... 428/419 |
| 2004/0173662 A1 | 9/2004 | Christner |
| 2004/0229989 A1 | 11/2004 | Fan |
| 2005/0087582 A1* | 4/2005 | Van Aken et al. ........ 228/112.1 |

OTHER PUBLICATIONS

Jezewski, Christopher, et al., "Effective Pore Sealing of Ultralow-k Dielectrics", *Semiconductor International*, 27(5), (May 1, 2004), 56-59.

Murari, A., et al., "Ultra high vacuum properties of some engineering polymers", *IEEE Transactions on Dielectrics and Electrical Insulation*, 11(4), (Aug. 2004), 613-619.

\* cited by examiner

SEALANTS FOR STRUCTURAL MEMBER JOINTS AND METHODS OF USING SAME

STATEMENT OF GOVERNMENT RIGHTS

This invention was made with support of the United States Government under Air Force Research Laboratory Contract No. FA8650-04-C-5704. The Government has certain rights in this invention.

FIELD

The present invention relates to structural member joints, and more particularly, to sealants for structural member joints and methods of using same.

BACKGROUND

Joints between structural members are often formed by overlapping the two members together to create a lap joint. The lap joint is secured together by various means. In some instances, holes are drilled and rivets or other fasteners are disposed through the holes. Such overlapping surfaces can also be joined by welding the structural members together using one or more welds at the overlap of the materials. One type of welding process used to join lap joints is friction stir welding (FSW) in which a rotatable pin extends in a direction generally perpendicular to the interface of the members and is urged through the members along the interface.

However, the surfaces of each piece of joined metal adjacent the fasteners or welds mated by the lap joint, called "fay" surfaces, are often not fully bonded by the weld or other fasteners. The resulting spaces in the interface are open to moisture, chemicals, debris, and other foreign materials. This can result in increased corrosion of the structural members. In FSW, for example, the resulting nugget is typically not as wide as the interface of the overlapping members, such that the members define spaces in the interface in which corrosion can occur.

In order to control corrosion in these joints, sealants are often disposed in the spaces prior to, during, and/or after welding. Conventional sealants are known to reduce moisture which may be trapped between the faying surfaces and/or brought in by capillary action. These sealants are also useful for reducing mechanical and fatigue problems resulting from rubbing between the faying surfaces, vibration, and the like. Conventional faying surface sealants include polysulfide, polythioether, and the like, which are applied to the mating surfaces prior to joining.

However, many conventional sealants are degraded by the heat and mechanical activities involved in the welding process, as well as by vibration during use of the joined component. In some instances, the sealants become loosened from the interface. Specifically, when the sealant is applied before welding, care must be taken to avoid introducing the sealant into the nugget of the joint because the sealant can negatively impact the strength and/or corrosion resistance of the joint. This can involve placing masking tape on the area of the structural members where the nugget will be formed, disposing the sealant on the structural members, and then removing the masking tape to leave a relatively clean area for forming the nugget. However, such a process is time consuming. Additionally, even if such precautions are taken, some of the sealant can be squeezed into the interface as members are positioned and urged together to form the joint. The sealant then mixes with the plasticized material of the joint, thereby reducing the quality of the weld joint.

Therefore, what is needed are improved sealants and methods for forming a corrosion resistant joint in structural members.

SUMMARY

Sealants and methods for forming a joint, such as a weld joint, between one or more structural members are provided. In one embodiment, the sealant, which is disposed between faying surfaces of the one or more structural members, comprises a thermoplastic material having a melting temperature lower than the melting temperature of at least one of the structural members. In embodiments which utilize friction stir welding, the temperature is also preferably lower than the highest temperature generated during friction stir welding. In most embodiments, the sealant fills the spaces between the one or more structural members to prevent entry of chemicals, moisture, debris, and other substances, thereby reducing the likelihood of corrosion of the joint or structural members at the interface. In one embodiment, the one or more structural members comprise first and second substantially parallel members defining the faying surfaces respectively, and the joint extends substantially perpendicular through the interface of the faying surfaces. In one embodiment, at least one of the substantially parallel members has a T-configuration or sub-structure. In one embodiment, there is only a single structural member such as a tubular member or otherwise curved member with overlapping edges.

In one embodiment, the thermoplastic sealant is selected from the group consisting of polyethylenes, polypropylenes, polystyrenes, polyvinylchlorides, polytetrafluoroethylenes, polyamides (e.g., nylon-6, nylon-11, nylon-12, nylon-13 or nylon 6/6), acrylics, acetals, polycarbonates, polyesters, further including polyimides, polyetheretherketones, polyphenylene sulfides, polyether sulfones, polyamideimides, polyphenylene oxides, and any combination thereof. In one embodiment, the thermoplastic sealant contains no fillers. In another embodiment, the thermoplastic sealant contains one or more fillers such as plasticizers, glass fibers, coloring additives, conductive additives, metal oxides and any combination thereof. Although the sealant is preferably non-conducting and therefore does not affect galvanic corrosion of the joint, the invention is not so limited. In other embodiments, the sealant is conducting, such as with the addition of copper or aluminum powder, such that the sealant can be cathodic relative to at least one structural member.

The sealant can have any suitable melting temperature. In one embodiment, the sealant has a melting temperature less than about 500° C. In another embodiment, the sealant has a melting temperature of at least about 150° C.

In one embodiment, a sealed joint comprising at least one structural member defining first and second faying surfaces in an opposed configuration and defining an overlapping interface therebetween; a sealed joint extending through the overlapping interface and connecting the first and second faying surfaces of the at least one structural member; and a thermoplastic sealant disposed in the interface, wherein the thermoplastic sealant has a melting temperature lower than the melting temperature of the at least one structural member is provided.

In one embodiment, a weld joint comprising at least one structural member defining first and second faying surfaces in an opposed configuration and defining an overlapping interface therebetween; a weld joint extending through the overlapping interface and connecting the first and second faying surfaces of the at least one structural member; and a thermoplastic sealant disposed in the interface, wherein the thermoplastic sealant has a melting temperature lower than the melting temperature of the at least one structural member, are provided. In one embodiment, the weld joint comprises a nugget area formed by friction stir welding. In one embodiment, the sealant substantially fills the interface.

In most embodiments, each structural member is made from the same metal, although the invention is not so limited. In other embodiments, there are at least two structural members, each made from a different metal. In yet other embodiments, there are at least two structural members, with at least one structural member made from a metal composite or non-metal composite, such as a polymer matrix composite, ceramic, graphite reinforced epoxy, and the like.

In one embodiment, a method of sealing a joint comprising disposing a thermoplastic sealant on at least one of first and second faying surfaces of at least one structural member; positioning the faying surfaces in an opposing configuration to form an interface therebetween; and joining the at least one structural member to form a sealed joint extending through the interface and thereby heating the thermoplastic sealant such that the sealant bonds with the at least one structural member proximate to the sealed joint, wherein the sealant has a melting temperature lower than the melting temperature of the at least one structural member is provided. In one embodiment, the joining step comprises heating the sealant to at least the melting temperature of the sealant. In another embodiment, the joining step comprises heating at least a portion of the sealant to a temperature no greater than the melting temperature of the sealant wherein the sealant is bonded to the at least one structural member.

In one embodiment, the joining step comprises rotating a pinless tool, i.e., a burnishing tool, and urging the shoulder parallel to the interface to thereby friction heat the at least one structural member and cause the sealant to melt, thus forming a faying surface seal and adhesive bond between the overlapped members. In one embodiment, at least one of the structural members is a non-metal or non-metal composite as described above. The pinless tool is placed in contact with the metal component and generates sufficient heat to melt the sealant. The tool is then urged along the surface to form a bond to the non-metallic member. In one embodiment, the metal member is a top skin and the non-metal member is located beneath. The non-metal member may have a T-substructure, although the invention is not so limited.

In one embodiment, a method of sealing a weld joint comprising disposing a thermoplastic sealant on at least one of first and second faying surfaces of at least one structural member; positioning the faying surfaces in an opposing configuration to form an interface therebetween; and welding the at least one structural member to form a weld joint extending through the interface and thereby heating the thermoplastic sealant such that the sealant bonds with the at least one structural member proximate to the weld joint, wherein the sealant has a melting temperature lower than the melting temperature of the at least one structural member, is provided. In one embodiment, the welding step comprises heating the sealant to at least the melting temperature of the sealant. In another embodiment, the welding step comprises heating at least a portion of the sealant to a temperature no greater than the melting temperature of the sealant wherein the sealant is bonded to the at least one structural member. In one embodiment, the welding step comprises rotating a friction stir welding pin extending from a shoulder and urging the pin through the interface to thereby friction stir weld the at least one structural member.

The thermoplastic sealant can be disposed in any suitable manner, such as with plasma spraying, electrostatic spraying or with a type of hot "glue gun," resulting in a sealant having a thickness of between about 0.0025 and 0.1 cm. In one embodiment, the thermoplastic sealant is in the form of a tape that is applied to the faying surfaces. In one embodiment, the disposing step comprises disposing the sealant on both of the first and second faying surfaces. In one embodiment, the positioning step comprises overlapping the faying surfaces to form the interface having a width about equal to the width of the shoulder.

The thermoplastic sealants described herein have excellent static and fatigue properties at room temperature, providing excellent corrosion control at minimal cost and environmental impact. The sealants have the further advantage of not setting or curing immediately, thus providing flexibility during the manufacturing process as to the timing of sealant application and welding. Additionally, there is minimal to no adverse impact on the strength of the welding joint with use of these sealants. The sealants may be even further optimized with additional surface preparation, addition of fillers to provide a desired property, adjustment of weld parameters, and so forth.

DETAILED DESCRIPTION OF THE EMBODIMENTS

Figure 1:
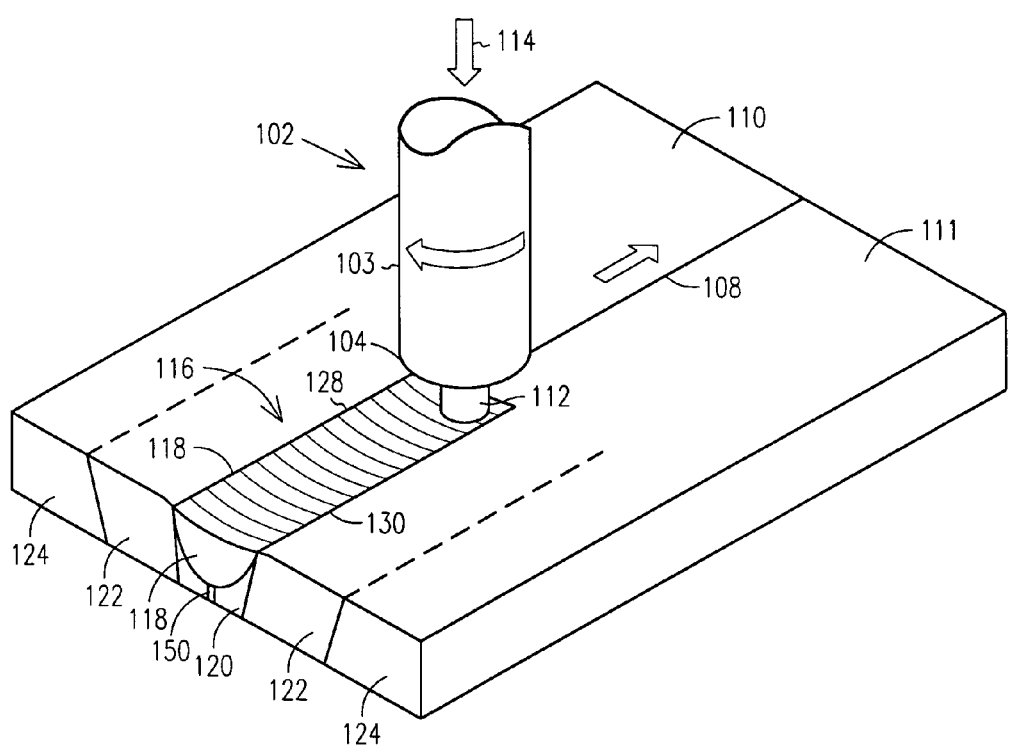
FIG. 1 is a simplified perspective view of a conventional friction stir welding operation for forming a butt weld between two workpieces in one embodiment of the present invention.

In the following detailed description of embodiments of the invention, reference is made to the accompanying drawings that form a part hereof, and in which is shown by way of illustration specific preferred embodiments in which the subject matter may be practiced. These embodiments are described in sufficient detail to enable those skilled in the art to practice them, and it is to be understood that other embodiments may be utilized and that mechanical, chemical, structural, electrical, and procedural changes may be made without departing from the spirit and scope of the present subject matter. The following detailed description is, therefore, not to be taken in a limiting sense, and the scope of embodiments of the present invention is defined only by the appended claims.

The Detailed Description that follows begins with a definition section followed by a brief overview of frictional stir welding (FSW), followed by a description of the embodiments, an example section and a brief conclusion.

Definitions

The term "thermoplastic polymer" or "thermosoftening plastic" or "thermoplastic" as used herein refers to any plastic that can be repeatedly softened upon heating and hardened upon cooling, in contrast to a thermosetting plastic or a thermoplastic elastomer as defined below. Thermoplastics are bonded together by Van der Waals forces and generally do not undergo cross-linking upon heating. (However, polymers containing a high number of unsaturated bonds can react further under exposure to heat or ultraviolet light to produce cross-linking. Therefore, most thermoplastics will resoften and eventually melt to a liquid state when reheated. Thermoplastics are capable of being formed into a filament in which the structural elements are oriented in the direction of the fiber axis. Examples include, but are not limited to, polyethylene, polystyrene and polyvinyl chloride (PVC).

The term "thermosetting plastic" or "thermoset resin" as used herein refers to any plastic that can be formed into a shape during manufacture, but which sets permanently rigid, i.e., fully cures, during heating. This is due to extensive cross-linking, which occurs upon heating and cannot be reversed by reheating. Therefore, rather than melting when reheated, a thermosetting plastic may only soften before it decomposes by charring and burning.

The term "thermoplastic elastomer" or "elastomer" as used herein refers to a plastic that can be formed into a shape during manufacture, but has "rubber-like" properties which allow it to stretch and return to its original shape even after it is set. However, an elastomer cannot be reheated to change its shape, and over time, may become rigid with further cross-linking upon exposure to heat or ultraviolet light. A thermoplastic elastomer is capable of undergoing vulcanization, i.e., cross-linking with sulfur), including room temperature vulcanization (RTV). Thermoplastic elastomers are discussed in U.S. Patent Application 2004/0173662 to Christner (hereinafter "Christner"). Oftentimes, elastomers are fluorinated to reduce the temperature at which the material becomes brittle and glass-like (see discussion of fluoroelastomers, i.e., fluoroelastic polymers, in Christner).

The term "nylon" as used herein is a generic name for any long chain synthetic polymeric amide which has recurring amide groups as an integral part of the main polymer chain. Examples include, but are not limited to, nylon-6, nylon-11, nylon-12, nylon-13 and nylon 6/6.

Overview of Friction Stir Welding

Welding techniques typically use elevated temperatures to bond metals and metal alloys. Friction stir welding (FSW) is a welding technique which allows two components, e.g., sheets, plates, etc., to be joined together in the solid state, i.e., without melting, through use of a rotating cylindrical tool with pin. The welds can be made on many types of materials in any position at welding speeds of up to several inches per minute.

In the embodiment shown in FIG. 1, a rotating tool 102 having a cylindrical portion 103 with a shoulder 104 is moved along a joint line or interface 108 located between two members 110, 111. The shoulder 104 is located at the junction of the cylindrical portion 103 and a probe or rotatable pin (hereinafter "pin") 112. The pin 112 extends in a direction generally perpendicular to the interface of the members or is urged through the members 110, 111 along the interface 108. Frictional heat generated by the pin 112 induces gross plastic deformation or softening in the members 110, 111, thus allowing the rotating tool 102 to be moved along the interface 108 as the plasticized material is being mixed by the pin 112. Sufficient downward force 114 needs to be maintained to ensure continuous contact between the shoulder 104 and the interface 108. As the plasticized material is mixed and forged together beneath the tool, a FSW joint 116 is formed, characterized by a mixed portion usually having a refined grain structure, referred to as a nugget 118. In one embodiment, rotation of the shoulder 104 produces a semi-circular striation pattern on the surface as shown in FIG. 1.

The nugget 118 is generally smaller than the width of the shoulder 104 and slightly larger than the pin 112. Although the precise microstructure of a friction-stir weld depends on many factors, such as tool design, rotation and translation speeds, applied pressure, characteristics of materials being joined, and so forth, friction stir welded materials have a characteristic cross-section as is known in the art and illustrated in FIG. 1. Specifically, the nugget 118 is surrounded by a thermomechanically affected zone (TMAZ) 120 having a different microstructure as is known in the art. Slightly further away is a heat affected zone (HAZ) 122, with unaffected material 124 located yet further away from the FSW joint 116.

Figure 5:
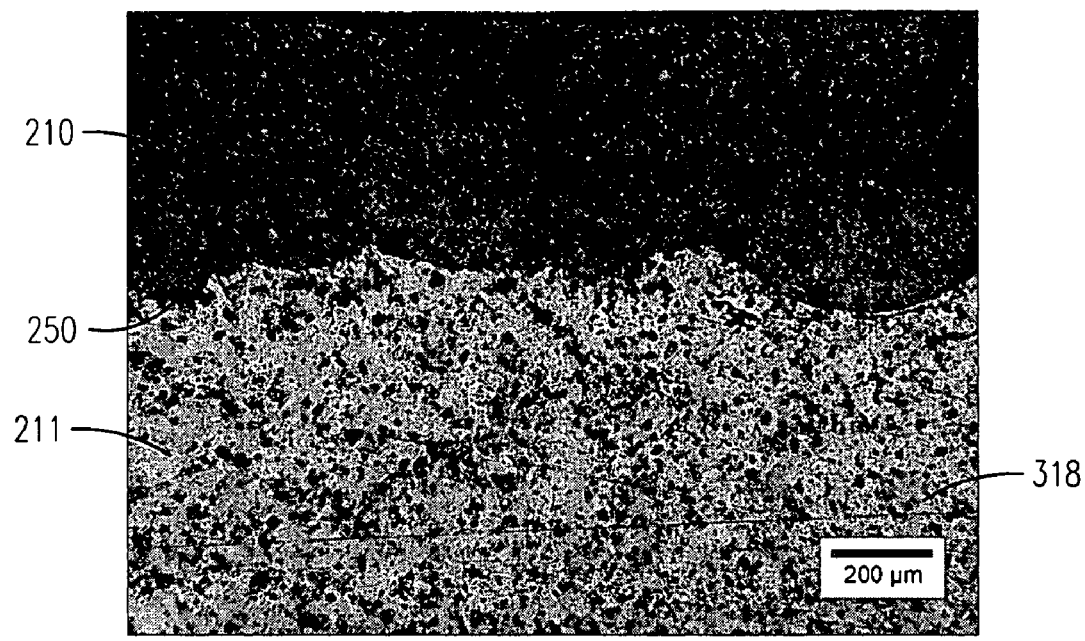
FIG. 5 is an enlarged microstructure image of a retreating side of the friction stir weld joint as indicated by FIG. 4 in one embodiment of the present invention.

The opposing sides of the FSW joint 116 also have specific textures. An advancing side 128, i.e., the side on which the motion and rotation direction of the rotating tool 102 are in the same direction, has a sharp boundary between the nugget 118 and the TMAZ 120. (See, for example, FIGS. 6 and 10). In contrast, a retreating side 130, i.e., the side on which the rotation direction is opposite to the motion of the rotating tool 102, has a more complex microstructure with no clear boundary between the nugget 118 and the TMAZ 120. (See, for examples, FIGS. 5 and 9).

In the embodiment shown in FIG. 1, the butt weld has a gap 150, i.e., the weld is incomplete. Such a weld would benefit from application of a sealant, such as the sealants described herein.

FSW produces solid state joints without the addition of filler or the use of shielding gases. This technique allows welding of materials which were previously considered difficult to weld reliably without the presence of voids, cracking or distortion. FSW is advantageously used in many applications, including, but not limited to, aircraft construction. Other details of FSW are understood in the art and will not be discussed further herein. See, for example, "Characterising texture variations in a friction stir welded aluminium alloy," http://www.hkltechnology.com/data/0-FSW-aluminium.pdf, EBSD Application Notes, HKL Technology, Inc., Danbury, Conn., 2005, pages: 28-31 and U.S. Pat. No. 5,460,317 to Thomas, et al., both of which are incorporated herein by reference.

Discussion of the Embodiments

In one embodiment, a sealed joint comprising at least one structural member defining first and second faying surfaces in an opposed configuration and defining an overlapping interface therebetween; a sealed joint extending through the overlapping interface and connecting the first and second faying surfaces of the at least one structural member; and a thermoplastic sealant disposed in the interface, wherein the thermoplastic sealant has a melting temperature lower than the melting temperature of the at least one structural member is provided. In one embodiment, there are two structural members, each formed of a different metal. In yet other embodiments, there are two structural members, and at least one structural member is formed of a metal composite or non-metal composite, such as a polymer matrix composite, ceramic, graphite reinforced epoxy, and the like.

In one embodiment, a weld joint comprising at least one structural member defining first and second faying surfaces in an opposed configuration and defining an overlapping interface therebetween; a weld joint extending through the overlapping interface and connecting the first and second faying surfaces of the at least one structural member; and a thermoplastic sealant disposed in the interface, wherein the thermoplastic sealant has a melting temperature lower than the melting temperature of the at least one structural member, are provided. In one embodiment, the weld joint comprises a nugget area formed by friction stir welding. In one embodiment, the sealant substantially fills the interface.

Figure 2A:
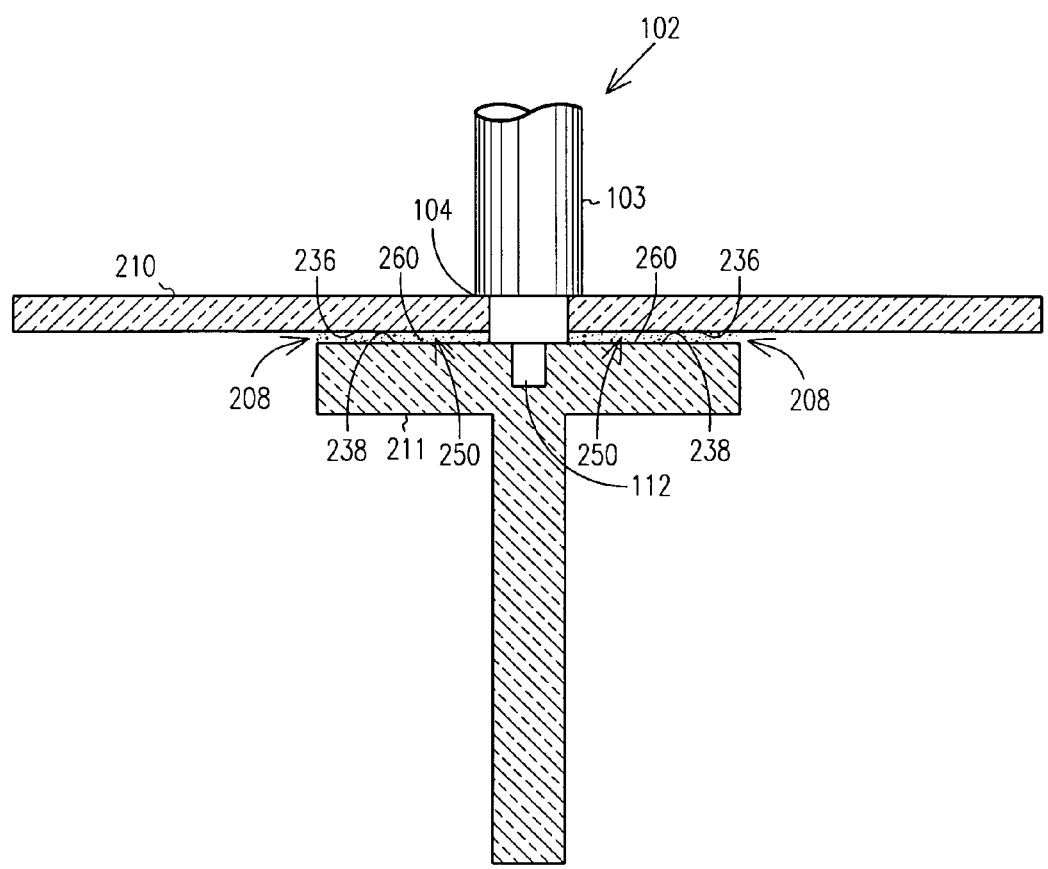
FIG. 2A is a simplified cross-sectional view showing a friction stir welding tool configured to weld structural members in a T-configuration in one embodiment of the present invention.

FIG. 2A shows a cross section of a lap joint between a first structural member 210 and a second structural member 211. In the embodiment shown in FIG. 2A, the first structural member 210 is a top skin and the second structural member 211 has a T-substructure, although the invention is not so limited. The sealants and associated methods described in the various embodiments of the present invention can be used on virtually any type of interface which can be joined together. In one embodiment, both members are planar, such as the members shown in FIGS. 1 and 2 of U.S. Pat. No. 6,905,060 to Van Aken. In another embodiment, a single structural member is joined using the various methods described herein. The single structural member can include, but is not limited to, a tubular member or an otherwise curved member with overlapping edges. In yet another embodiment three or more structural members are joined. In one embodiment, the various sealants of the present invention are used in a butt joint in which a faying surface is created by a nugget that only partially joins the materials.

The faying surfaces are defined where the first structural member 210 overlaps the second structural member 211. Specifically, the first structural member 210 has a first faying surface 236 and the second structural member 211 has a second faying surface 238, such that an interface 208 is formed therebetween. (In the embodiments shown in FIGS. 2A, 2B and 3, the interface 208 is enlarged for clarity).

Figure 3:
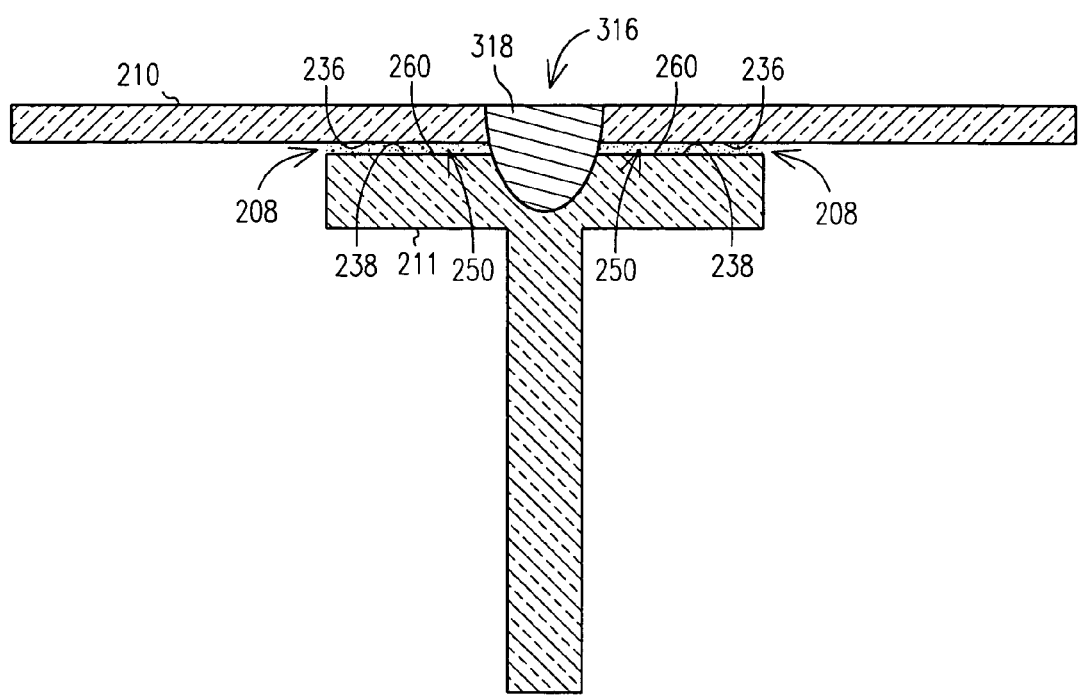
FIG. 3 is a simplified cross-sectional view showing a weld resulting from use of the friction stir welding tool shown in FIG. 2A in one embodiment of the present invention.

Any size and shape of rotating tool 102 can be used. In the embodiment shown in FIG. 2A, the diameter of the cylindrical portion 112 engaged within 210 is wider than the diameter of the pin 112 engaged within 211, although the invention is not so limited. The pin 112 of the rotating tool 102 is inserted through the interface 208 generally perpendicular to the interface 208. An anvil (not shown) or other support can be disposed against the second structural member 211 to oppose the rotating tool 102. The rotating tool 102 is then urged against the first structural member 210 and advanced along the interface 208 of the structural members 210, 211 as the pin 112 rotates, i.e., into the plane of the paper, with the shoulder 104 of the rotating tool 102 contacting the first structural member 210. The friction generated by the pin 112 causes the material in each member to plasticize as discussed above. The materials are then mixed and forged by the shoulder 104 and pin 112 to form a weld joint 316 as shown in FIG. 3. The weld joint 316 connects the first and second structural members 210, 211. The weld joint 316 is characterized by a nugget 318 proximate to the path of the pin 112 as shown in FIG. 2A.

The weld joint 316 formed by the configuration shown in FIG. 2A is generally referred to as a lap joint, i.e., a joint generally perpendicular to the interface of overlapping members. In other embodiments, other weld joints can alternatively be formed by friction stir welding. In addition, other types of friction welding, such as linear friction welding, friction stir spot welding (see, for example, U.S. Pat. Nos. 6,892,924 and 6,883,699 to Stevenson, et al., both of which are hereby incorporated by reference), and the like, can also be used to join members. In other embodiments, welding devices and methods other than friction welding devices and methods are used. Further, the structural members 210, 211 can also be joined without welding, for example, by solder joints, braze joints, rivets, bolts, clips, other fasteners, crimps, and the like. Embodiments of the present invention are not intended to be limited to these or other types of joints, and instead can be used with a wide variety of joints for connecting structural members 210, 211.

The structural members 210, 211 can define any of a variety of shapes such as sheets, plates, blocks, and the like. Essentially, the structural members 210, 211 can be any structure that can also be joined together by riveting. The members 210, 211 can be formed of metals, such as aluminum, titanium, or alloys thereof, metal matrix composites, and the like. In one embodiment, one or both members are made from non-metal composites. In one embodiment, the members 210, 211 are anodized, e.g., anodized aluminum, although anodization is known to reduce the ductility and strength of a weld, such as a friction stir weld. Further, the members 210, 211 can be joined to create an assembly used for various applications including frames, panels, skins, airfoils, and the like for aeronautical and aerospace structures, such as aircraft and spacecraft, marine vehicles, automobiles, and the like. In some applications, the members 210, 211 are joined in geometrical configurations that make difficult or prevent subsequent access for inspecting or treating the joint. For example, the structural members 210, 211 can be overlapped and joined to form a partially or fully closed body such as an airplane wing. In other embodiments, the structural members 210, 211 can be a fuel tank, i.e., a wet bay.

Figure 2B:
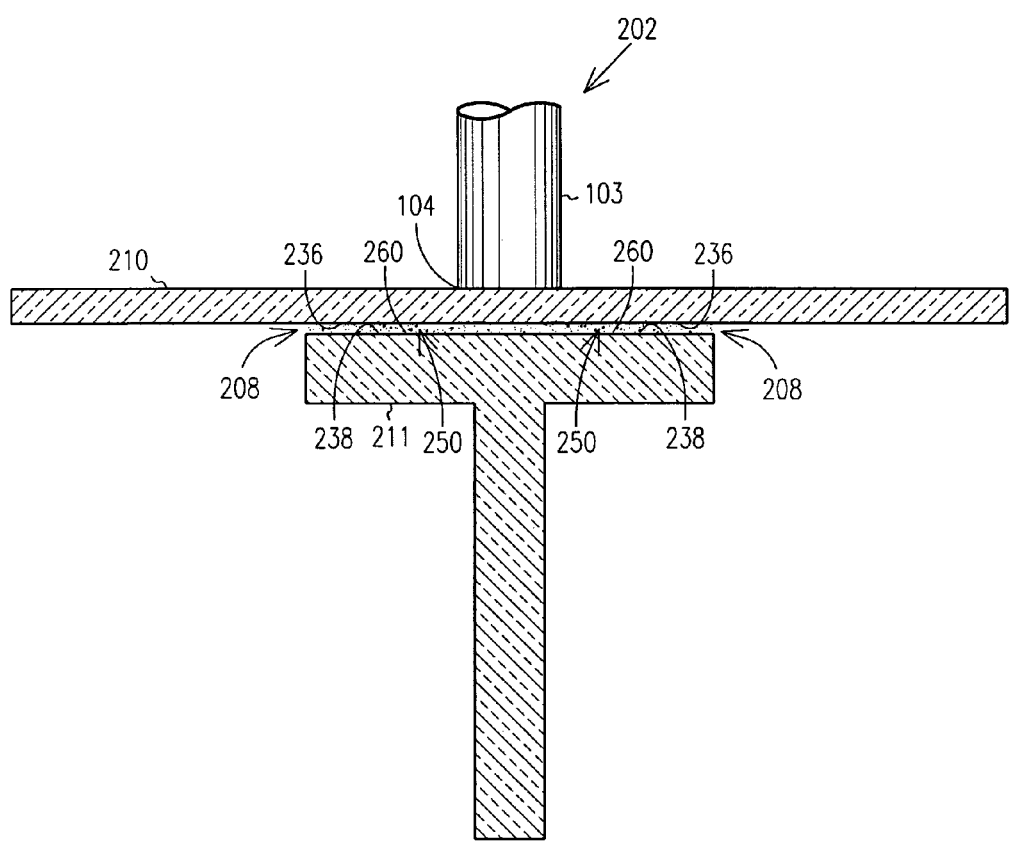
FIG. 2B is a simplified cross-sectional view showing a friction tool configured to join structural members in a T-configuration in one embodiment of the present invention.

FIG. 2B provides an alternative embodiment in which a pinless tool 202, i.e., a burnishing tool, having a body 103 and a shoulder 104 as in FIG. 2A, is used in a non-welding procedure to join together structural members 210, 211 having overlapping joints. The members 210, 211 are positioned as described herein, and a sealed joint (similar to the weld joint 316 in FIG. 3) is formed, which extends through the interface 208 when the sealant 260 is heated, such that the sealant 260 bonds with one or more of the structural members (210 or 211) proximate to the sealed joint. The sealant 260 necessarily has a melting temperature lower than the melting temperature of one of the structural members 210, 211. Such an embodiment is useful when each structural member 210, 211 is made from a different type of metal, such as aluminum and steel, or when at least one of the structural members 210, 211 is a non-metal or non-metal composite, such as a polymer matrix composite, ceramic, graphite reinforced epoxy, and the like. In one embodiment, member 210 is the metal member and 211 is the non-metal member. As with the other figures, although 211 is shown having a T-substructure, the invention is not so limited.

Referring again to FIGS. 2A and 3, although the faying surfaces 236, 238 of the structural members 210, 211 can correspond closely in contour, the interface 208 is characterized by spaces or voids 250 between the surfaces 236, 238 where the weld joint 316 is not formed, i.e., on either side of the weld joint 316. According to one embodiment of the present invention, a sealant 260 is disposed between the structural members 210, 211 at the interface 208 thereof prior to the weld joint 316 being formed, although the invention is not so limited. The sealant 260 can be disposed at any suitable time during the manufacturing process. The sealant 260 can also be disposed on one or both of the faying surfaces 236, 238 of the structural members 210, 211, and can be disposed over part or all of the area of the interface 208, including the nugget region 318. Thus, the sealant 260 can fill the spaces 250 between the faying surfaces 236, 238 of the structural members 210, 211. The sealant 260 prevents chemicals, moisture, debris, and other substances from entering the spaces 250, thereby preventing corrosion or other damage that can be caused by those substances.

Embodiments of the present invention provide a sealant 260 made from a thermoplastic material. The thermoplastic material can include, but is not limited to, polyethylene, polypropylene, polystyrene, polyvinylchloride, polytetrafluoroethylene (i.e., Teflon®), polyamide (i.e., various nylon materials including but not limited to nylon-6, nylon-1, nylon-12, nylon-13, nylon 6/6, and the like), acrylics such as Lucite®, acetals, polycarbonates, polyesters, and so forth. The thermoplastic preferably flows under the application of heat and pressure as would be experienced during a friction stir welding process, although the invention is not so limited. It is possible that the sealant 260 can be used as the primary bonding agent between the structural members 210, 211, where a tool is rotated on the surface of structural member 210 to generate heat and a compressive pressure to force 210 onto 211.

The sealant 260 can also include one or more additional materials as fillers in order to provide desired properties. For example, the sealant 260 can be modified for high or low temperature use, depending on the filler used. Addition of a plasticizer produces a more pliable sealant 260 which is useful at lower temperatures, i.e., below about 23° C. However, it is possible that addition of a plasticizer may adversely affect the bond strength of the sealant to the structural members, although those skilled in the art could likely develop a formulation which maximizes pliability while minimizing any adverse affect on bond strength. Any suitable plasticizer can be used. In one embodiment, Parmerol® UNIPLEX 214 made by Unitex Chemical Corporation having offices in Greensboro, N.C. is used. Addition of glass fibers, i.e., E-glass fibers, to powder coatings can improve creep resistance at higher temperatures, i.e., above about 100° C. Other additives add color (e.g., titania particles add a white color, graphite particles add a black color, and so forth). Yet other additives are conductive additives (e.g., copper) which change electrical properties by making the sealant 260 conductive, as discussed above. Yet other additives, such as metal oxides (e.g., copper oxide) help to reduce biofouling, which is important on ship hulls. The copper oxide kills bacterial growths that are the food source of barnacles. Biofouling is also an issue for wet fuel bays where bacteria grow, die and decompose to form an acid solution. Copper oxide keeps the bacterial population to a minimum, thus reducing the acid produced with decomposition.

In one embodiment, the sealant 260 has a melting temperature comparable to the temperature of the welding process being used. In one embodiment, the sealant 260 is characterized by a melting temperature less than the melting temperature of at least one of the structural members 210, 211 and the highest temperature generated during welding. In this way, the sealant 260 can be bonded to portions of the faying surfaces 236, 238 of the structural members 210, 211, including portions of the faying surfaces 236, 238 where the structural members 210, 211 are not melted during welding. The term "melting temperature," is meant to refer to a temperature at which the sealant 260 becomes at least partially melted and sufficiently hot for bonding to the structural members 210, 211. In some embodiments, the sealant 260 is formed of multiple constituent materials, one or more of which can have a melting temperature that is equal to or higher than the melting temperature of the sealant 260 and/or the structural members 210, 211. Further, the melting temperature of the sealant 260 can be lower than the melting temperatures of all of the constituent materials. The melting temperature of the sealant 260 can be less than about 500° C., for example, between about 350° C. and 450° C., which is less than the melting temperature of many aluminum and titanium alloys and lower than the temperatures at which these materials are typically friction stir welded. Thus, the melting temperature can be sufficiently low so that some or all of the sealant 260 is melted during the weld process, for example, by the frictional heat generated during friction stir welding. In one embodiment, the sealant 260 has a melting temperature no less than about 150° C. In another embodiment, the sealant 260 has a melting temperature between about 150° C. and 180° C. or greater, up to about 200° C. or more. In yet another embodiment, the sealant 260 has a melting temperature range between about 150° C. and 180° C.

The sealant 260 is disposed as a polymer layer, i.e., no curing or polymerization reaction occurs. The sealant 260 also does not undergo any type of vulcanization, such as RTV. Since no curing or vulcanization takes place with this material, the sealant 260 can be applied at essentially any stage of the manufacturing process prior to the joint being welded. This is in contrast to known sealants, such as thermosetting plastics or thermoplastic elastomers, which are disposed as a monomer layer and then cured to form a polymer. Most thermoplastic elastomers also undergo room temperature vulcanization, thus requiring immediate welding after application of the sealant.

In one embodiment, the sealant 260 is repairable even after the joint has been welded. This can be important if it is determined after the fact that the sealant was not disposed in certain areas of the joint, was disposed too thinly, or is just not holding for any reason. Specifically, the sealant 260 can be remelted using any suitable heat source, such as in an oven, a propane torch, an air heating gun and the like. The joint can also be repaired by rewelding such that the FSW tool is urged through the joint and the sealant remelted. In one embodiment, the sealant 260 is remelted more than once. In one embodiment, the sealant is repairable by heating the joint to at least the melting temperature of the sealant for a sufficient period of time to bond with the structural members 210, 211. In a particular embodiment, a joint showing sealant separation is heated to about 200° C. for about 15 minutes to repair the joint.

The sealant 260 can be formed by any of various methods that are known in the art for forming powdered polymer blends, copolymers or mixtures of the aforementioned components together with fillers. For example, the sealant 260 can be formed by melting and mixing the constituent materials. The molten mixture can be cast or extruded and allowed to cool to form a solid which can then be milled into a fine powder. The sealant 260 is then disposed on one or both of the faying surfaces 236, 238 of the structural members 210, 211 by any suitable means known in the art. For example, the sealant 260 can be spread by hand or sprayed as a coating onto the surface, such as with plasma spraying, flame spraying, high velocity oxy-fuel spraying, and the like. In one embodiment, the sealant is applied using an electrostatic sprayer which may provide for a more controlled application of the sealant and a uniform thickness, such as about 100 μm. In one embodiment, the sealant 260 is applied as a tape, which has the advantages of providing simplicity of application while avoiding problems associated with overspray and environmental issues involved in handling and spraying of polymer-based powders. In another embodiment, the sealant 260 is applied using a type of hot "glue gun," such that surface preparation steps, such as grit-blasting, may be omitted.

The particles of the sealant 260 can be heated and melted during the deposition process, while the structural members 210, 211 remain unmelted. Alternatively, the particles can remain unmelted during deposition as in electrospray deposition. The amount of sealant 260 disposed on the faying surfaces 236, 238 can vary, but in one embodiment, the layer of sealant 260 is about 0.1 to 0.2 mm (about 0.004 to 0.008 in) in thickness. The sealant 260 can be disposed over all or part of the faying surfaces 236, 238, including the portion of the interface 208 that is welded to form the nugget area 318 of the joint 316, although in some cases the sealant 260 may positively or negatively affect certain mechanical properties of the joint 316. Generally, plasma spraying is preferred for thicker layers. Electrostatic spraying can also be used, but generally produces thinner layers and is typically affixed by application of heat by any suitable means, such as with friction stir welding or oven-baking at the melting temperature of the thermoplastic.

The sealant 260 is bonded to both of the structural members 210, 211. In some embodiments, adhesion of the sealant 260 to the surface is improved through some type of roughening process known in the art, although the invention is not so limited. In a particular embodiment, one or more surfaces are abraded by grit blasting prior to sealant application to improve sealant adhesion. Other surface roughening techniques include, but are not limited to, sandpaper, etc.

The sealant 260 is then heated to a temperature sufficient to thermally bond the sealant 260 to the faying surfaces 236, 238 of the structural members 210, 211, e.g., the melting temperature of the sealant 260. The thermal energy for heating the sealant 260 can be generated entirely by the welding process. For example, if the structural members 210, 211 are friction stir welded, the frictional heat resulting from the motion of the pin 112 and the shoulder 104 can heat the structural members 210, 211 and the sealant 260, thereby melting the sealant 260 so that the sealant 260 flows fluidly, adheres to the faying surfaces 236, 238, and is bonded thereto. While the sealant 260 close to the path of the pin 112 can be heated primarily by the pin 112, the sealant 260 that is further from the pin 112 may be heated to a greater extent by frictional heat generated between the shoulder 104 and the first structural member 210 as the shoulder 104 rotates against the structural member 210. Advantageously, the diameter of the shoulder 104 can be increased so that the shoulder 104 generates frictional heat over a greater area of the structural member 210. For example, according to one embodiment of the present invention, the diameter of the shoulder 104 is about equal to the width of the interface 208, such that the shoulder 104 generates frictional heat over the width of the interface 208. In one embodiment, the sealant 260 is disposed according to the methods described in U.S. Pat. No. 6,045,028 to Martin, et al., which is incorporated herein by reference.

Other welding or other connection methods can also sufficiently heat the sealant 260 to create the bond between the sealant 260 and the faying surfaces 236, 238. In addition, a heat source (not shown) other than the device used for connection can be provided. For example, a radiant heater, such as an electric or gas oven or other heater, can be used to heat the sealant 260. Alternatively, the heat source can be a laser that is used to direct light onto the sealant 260 to heat the sealant 260. The laser can be configured to direct the light on the structural members 210, 211 or in a direction generally parallel to a plane of the interface 208 and toward the edges of the interface 208 to heat the sealant 260 at the perimeter of the interface 208. Such heat sources can also be used to repair the sealant 260, if needed, as discussed above.

In some embodiments of the present invention, some or all of the sealant 260 is not heated to the melting temperature, and therefore does not melt during the friction welding process. However, when subjected to sufficient heat and pressure during welding, the sealant 260 can be bonded at a temperature less than the melting temperature of the sealant 260. Thus, the sealant 260 can bond to the faying surfaces 236, 238 of the structural members 210, 211 and seal the interface 208 therebetween.

It is believed that the sealant 260 may reduce the displacement to failure, i.e., lower ductility, of a bare weld joint 316 by about 35%, and of an anodized weld joint 316 by about 25%. Anodization of the structural members alone was determined to reduce the displacement to failure by about 45%. It was also shown (See FIGS. 7 and 11) that the sealant 260 increases the stiffness of both bare and anodized weld joints 316 by about 25%.

The invention will be further described by reference to the following examples, which are offered to further illustrate various embodiments of the present invention. It should be understood, however, that many variations and modifications may be made while remaining within the scope of the present invention.

EXAMPLE 1

Starting Materials:

Nylon based powders were obtained from Morton Powder Coatings, a division of Rohm and Haas, having offices in Reading, Pa. The choice of powders was based upon powder size and melting temperature. A powder size of approximately 50 μm was desired for plasma spray application. A melting temperature less than 356° F. (180° C.) for the thermoplastic sealant was thought to be appropriate for complete sealing of the faying surfaces in a T-joint configuration. Powder coatings selected were based upon nylon-11, a polyamide resin, with the trade name Corvel®. Corvel® White (Morton Powder Coatings product number 78-1001) has a volume weighted mean diameter of 62 μm and contains both amorphous silica (1 to 5%) and titania (5 to 10%) as fillers for color and to promote flow. Corvel® Black (Morton Powder Coatings product number 78-7001) has a volume weighted mean diameter of 57 μm and contains both graphite (1 to 5%) and limestone (5 to 10%) as fillers for color and to promote flow. The glass transition temperature for this polyamide is approximately 42° C. (108° F.) and the melting temperature is approximately 150° C. (302° F.). These powders are designed for electrostatic spray application onto a surface prepared with a resin primer. The coating is then oven-baked to produce a glossy finished surface.

Test Procedure and Equipment:

The structural members used in these tests were conventional standard aluminum grade bare T-rails provided by Boeing Co. having offices in Saint Louis, Mo. The members were made from a cast aluminum alloy (A357 alloy) substructure and bare aluminum sheet (Aluminum alloy 2024-T8).

The two members were positioned to create a faying surface. Surface preparation involved grit blasting the faying surface of the T-substructure with silica sand prior to plasma spraying the nylon coatings onto the surface to enhance bonding of the coating to the surface.

A Sulzer-Metco 9 MB plasma gun made by SulzerMetco having offices in Westbury, N.Y., was utilized to apply approximately 200 to 300 μm thick coatings of the sealant. Spray parameters were fixed for all coatings made in this experiment at nine (9) kW input energy, 2.3 m$^3$/hr (about 80 ft$^3$/hr) argon flow rate, one (1) gram/min powder flow rate for plasma spraying the Corvel® White and Corvel® Black powders, and a working distance of about 7.6 to 10.2 cm (about three (3) to four (4) in).

After being sprayed, the skin was friction stir welded to the T-rail with a Cincinnati Milacron 20V system made by Cincinnati Milacron having offices in Cincinnati, Ohio, equipped with an axial force actuator made by Manufacturing Laboratories, Inc. having offices in Gainesville, Fla. The force actuator has features as described in U.S. Pat. No. 6,050,475 to Kindred, which is incorporated herein by reference. The FSW tool that was used was designed by Boeing Co. having offices in Saint Louis, Mo., for use with lap joints formed with material having a thickness of about 0.32 cm (about 0.13 in) was used. Prior to welding, however, a 2.54 cm (one (1) in) wide slot was milled in the top surface of each skin to reduce the sheet thickness at the weld to about 0.28 cm (about 0.11 in) to ensure pin penetration past the sealant and into the T-rail. The following friction stir welding parameters were used: 900 RPM, 25.4 centimeters per minute (10 in/min), and 6.2 kN (1400 lbs) of Z-force, i.e., a downward force transmitted through the tool which forced member 210 down onto member 211.

Static strength tests were conducted on sealed joints containing either Corvel® black or Corvel® white. Static tensile strengths were measured using a MTS Model 312.31 test frame equipped with a 100 kN servohydraulic actuator manufactured by MTS Systems Corporation having offices in Eden Prairie, Minn., equipped with an Instron 8800 digital control and data acquisition system made by Instron Corporation having offices in Norwood, Mass.

Test specimens were made from members 210 and 211, respectively, and were cut to provide approximately 3.81 cm (1.5 in) of welded joint. Each specimen was oriented so that the "T" substructure was in an inverted position. Prior to testing, the specimens 210 and 211 were preloaded to 0.44 to 0.89 kN (about 100 to 200 lb$_f$) to prevent the wedge grips from slipping. Tests were run in displacement control with a ramp rate of approximately 0.02 mm/sec (about 0.05 in/min).

Figure 13:
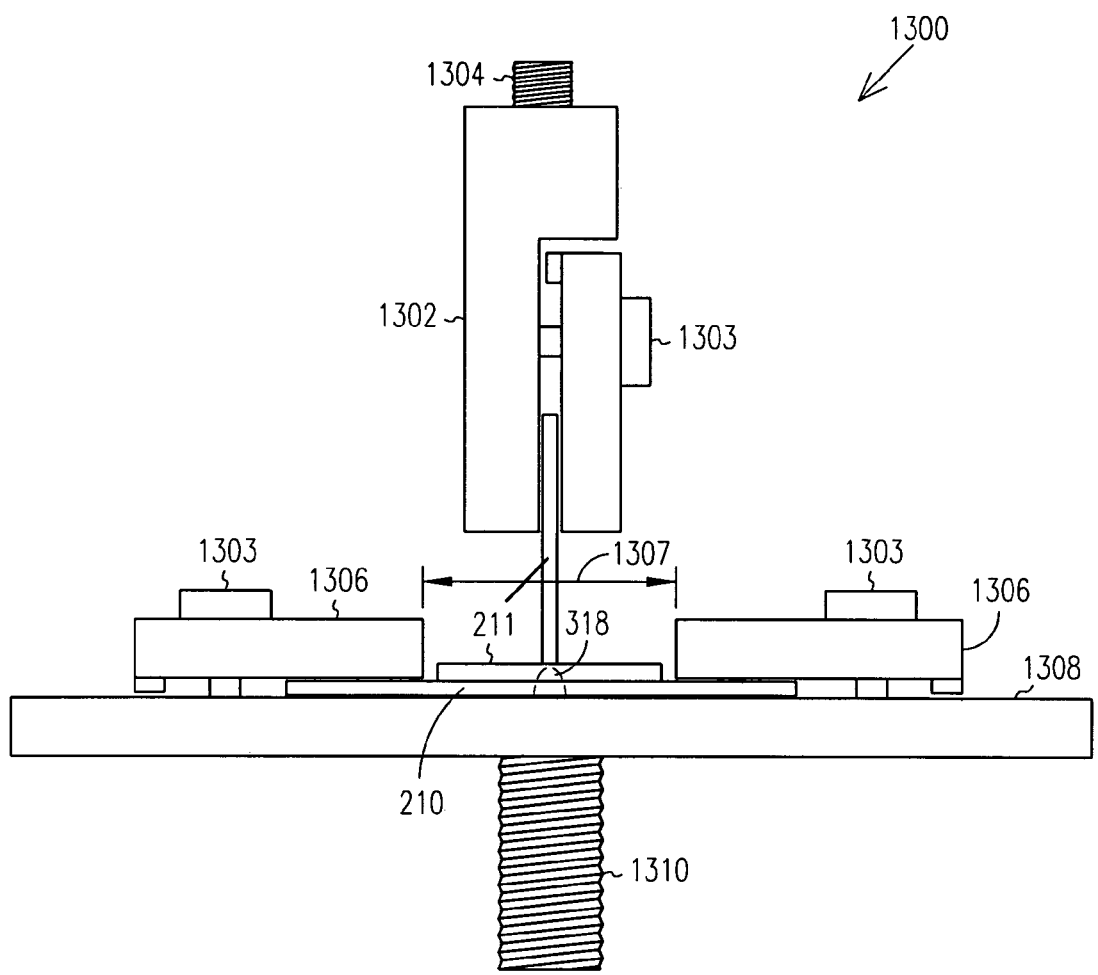
FIG. 13 is a simplified schematic of a gripping device for performing static tests in one embodiment of the present invention.

A gripping fixture having many of the components as shown in FIG. 13 was used in these tests. For example, ear clamps 1306 as shown in FIG. 13 were used to hold test specimen 210 for the static tests. However, rather than using a stationary clamp 1302 as shown in FIG. 13, an MTS Advantage TM wedge grip manufactured by MTS Systems Corporation was used to hold test specimen 211. In tightening the wedge grip, a tensile preload was applied to the test specimen. (However, as described in Examples 2 and 3 below, such preloading was not necessary with the stationary clamp 1302 of FIG. 13). During this testing, the ear clamps 1306 were separated by a distance 1307 of about 3.7 cm (about 1.47 in). Each ear clamp 1306 was secured in place to a clamping platen 1308 with two Grade 8 steel fasteners 1303 (one shown for each ear clamp 1306). The clamping platen 1308 is attached to a hydraulic piston (not shown) via a clamping platen threaded member 1310. The clamping platen 1308 was used to induce a downward displacement of test specimen 210 as is known in the art.

Welding Procedure Following Application of Corvel® Black:

The first approximately 38.1 cm (15 in) of the faying surface was welded at about 900 rpm and 25.4 cm/min (10 in/min). The feed rate was decreased to about 15.2 cm/min (about six (6) in/min) for the second 38.1 cm to provide a hotter weld. A 5.1 cm (two (2) in) gap in the Corvel® Black layer was present in the second half. Constant force was maintained throughout the weld, with the FSW tool dipping about 0.05 mm (about 0.002 in) in the area of the gap. During the welding process, the Corvel® Black melted, forming an ideal fillet everywhere except for the initial portion of the weld and the region originally void of sealant. At the beginning of the weld the skin did not contact the casting, but as the Corvel® Black melted, the skin was pushed down into direct contact with the T-rail. This is likely due to displacement of aluminum from the aluminum sheet (2024-T8) into the gap.

Welding Procedure Following Application of Corvel® White:

The baseline parameters described above were intended for the entire weld. However, as the tool travel range was not correctly set, the desired Z-force was not imposed for the first part of the weld. The desired Z-force was obtained from about 53.3 to 76.2 cm (about 21 to 30 in) and a sound weld was produced in this section. The results reported herein are from this section of the weld.

Figure 4:
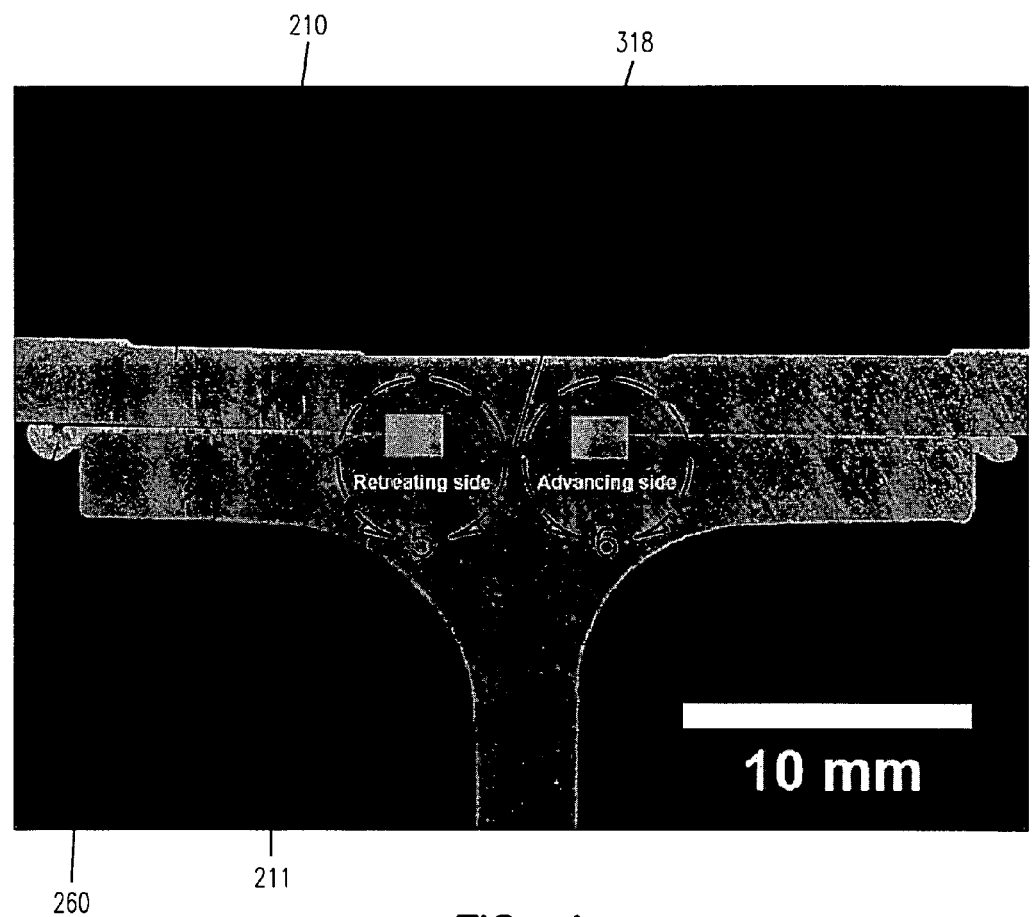
FIG. 4 is a photographic image of a bare friction stir weld joint in one embodiment of the present invention.

FIG. 4 is a photographic image taken by a Sony CCD video camera, model no. XC-77, made by Sony Corporation, having offices in Tokyo, Japan, together with a Nikkor 55 mm lens made by the Nikon Corporation, also having offices in Tokyo, Japan. FIG. 4 shows a resulting weld nugget 318 between structural members 210 (bare top skin), 211 (bare T-substructure) which contains sealant 260 (Corvel® White). The weld nugget 318 is located between the retreating side (shown in more detail in FIG. 5) and the advancing side (shown in more detail in FIG. 6). The gap 250 is also visible in FIGS. 5 and 6, with the sealant 260 visible in FIG. 6. There is little evidence of sealant intrusion into the weld nugget 318.

Results:

The average results of testing on bare aluminum with specimens containing sealant are summarized in Table 1 below:

TABLE 1

Summary of static tensile tests for friction stir welded T-Joints on Bare Aluminum

| Condition | *Maximum load kN/cm (lb$_f$/in) | *Sealant failure load kN/cm (lb$_f$/in) |
|---|---|---|
| Bare | 2.94 ± 0.05 (1679 ± 31) | |
|  | 2.94 ± 0.14 | 2.5 ± 0.33 |

TABLE 1-continued

Summary of static tensile tests for friction
stir welded T-Joints on Bare Aluminum

| Condition | *Maximum load kN/cm (lb/in) | *Sealant failure load kN/cm (lb/in) |
|---|---|---|
| Corvel ® White | (1678 ± 80) | (1424 ± 187) |
| | 2.4 ± 0.14 | 0 to 1.45 |
| Corvel ® Black | (1372 ± 79) | (0 to 828) |

*Uncertainty is based upon one sample standard deviation. All joints tested were welded at a tool traverse speed of 25.4 cm/min (10 in/min) and a tool rpm of 900.

Figure 6:
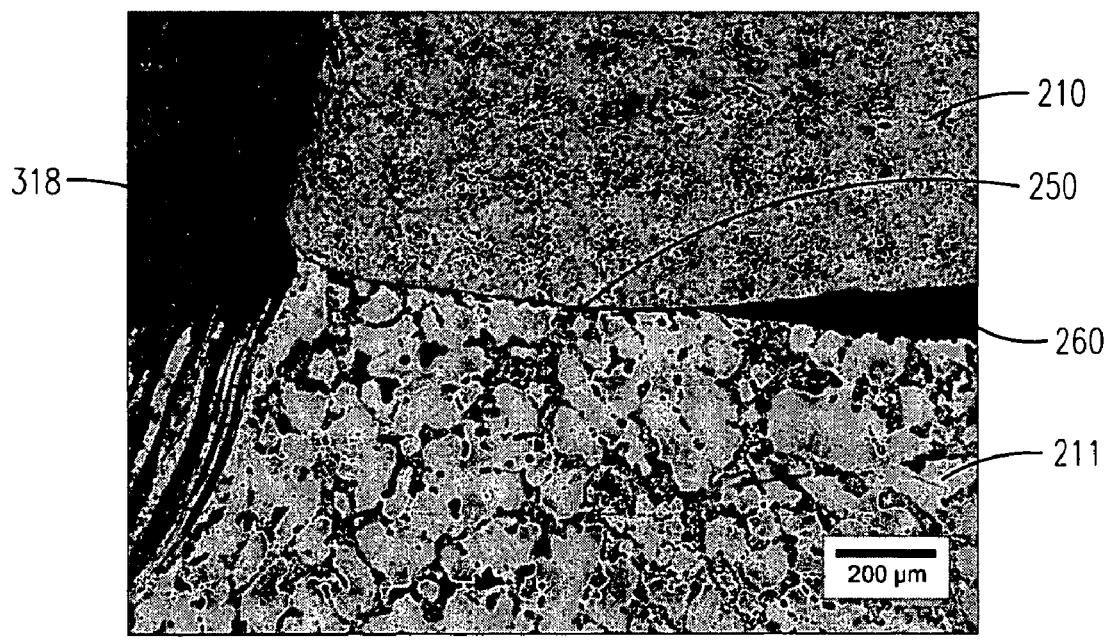
FIG. 6 is an enlarged microstructure image of an advancing side of the friction stir weld joint as indicated by FIG. 4 in one embodiment of the present invention.
Figure 7:
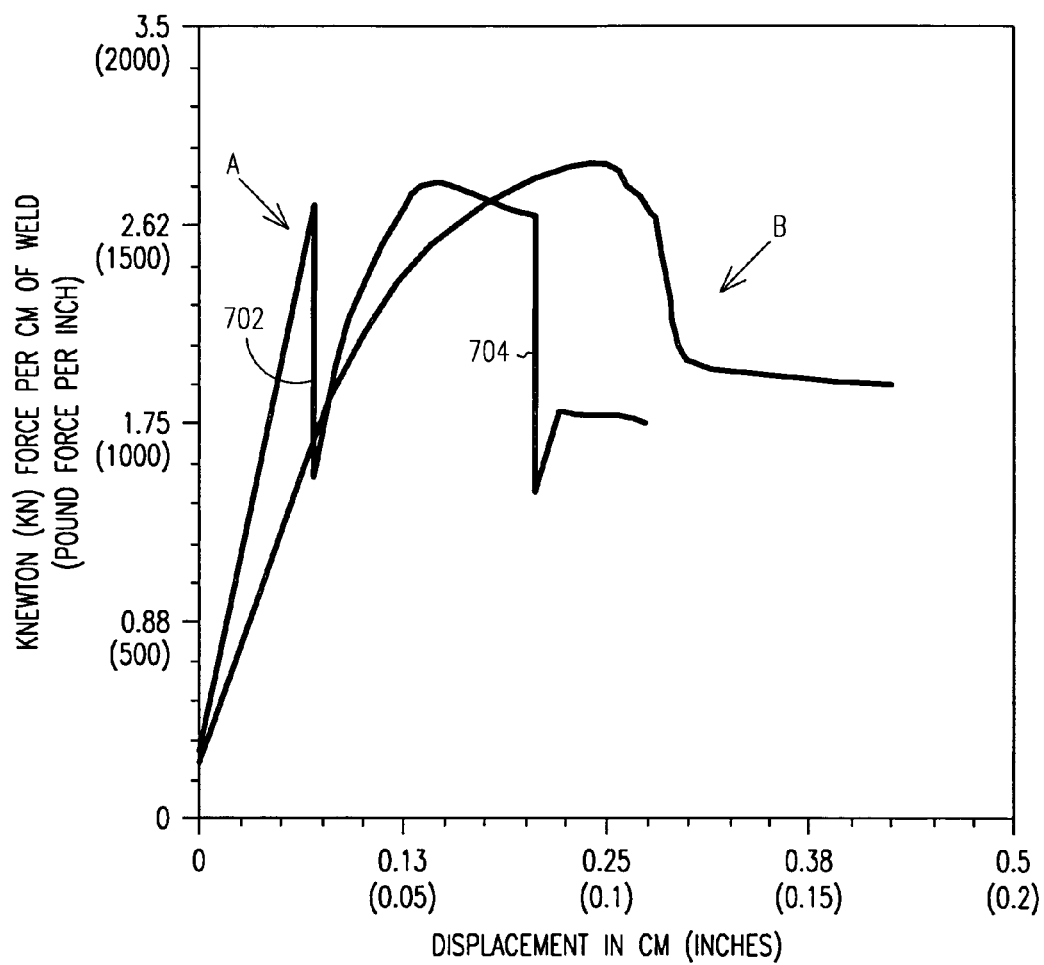
FIG. 7 is a plot showing force per distance of weld versus displacement for a bare T-weld with and without sealant in one embodiment of the present invention.

A comparison of loading curves "A" and "B" for a Corvel® White sealed joint and unsealed joint, respectively, is shown in FIG. 7. As FIG. 7 shows, the Corvel® White sealant performed very well, with static strengths equivalent to the bare metal welded joints. The sealed joint (curve "A") has a greater stiffness, which indicates that the sealant is carrying a portion of the applied load. This is corroborated by the sudden load drop each time the sealant fails. Specifically, the first load drop 702 corresponds with failure of the sealant in the advancing side of the weld (such as is shown in FIG. 6). The second load drop 704 corresponds with failure of the sealant in the retreating side of the weld nugget itself. After the second load drop 704, curves "A" and "B" follow nearly the same path. The test ends with failure of the weld nugget itself.

In all instances, there was an initial sealant failure at a load less than maximum, i.e., the sealant in one of the faying surfaces broke at 75 to 90% of the maximum load. Although FIG. 7 shows the advancing side failing first, there appears to be no correlation between sealant failure and the retreating or advancing side of the weld in this example. It is thought that this phenomenon may be related to the tool pushing sealant from the advancing side and depositing it on the retreating side in the same manner it moves the metal during welding. Thus, the retreating side tended to have a well-sealed joint while the advancing side tended to lose sealant. Application of additional sealant on the advancing side may alleviate this problem as any excess sealant would be expelled out of the gap by the downward Z-force. Additionally, close examination of the T-rail member indicates some asymmetry in the cross-section, which may have induced a bending moment as the joint was loaded in tension. Bending may also have been induced by small misalignments in gripping the specimens.

In at least two other tests with comparable results the second sealed surface failed simultaneously with the weld nugget. Although this has not yet been observed during testing, it is also possible that the first sealed surface may fail simultaneously with the weld nugget or that all three areas (retreating side, weld nugget and advancing side) may fail simultaneously.

The Corvel® Black did not effectively bond to the aluminum top skin. Sealant failure was substantially lower than joints sealed with Corvel® White as shown in Table 1. It is very likely that the graphite in Corvel® Black was welded at too low of a temperature, thus causing poor bonding. It is also possible that surface preparation would improve bonding. (Subsequent testing has shown that higher welding temperatures produced by increasing the tool RPM to about 1000 to 1100 RPM, or decreasing the weld in speed to about 18 to 23 cm/min, or a combination of both, improve the bonding of the sealant).

EXAMPLE 2

The same starting materials, test procedures and equipment as described in Example 1 were used in Example 2, except that Corvel® Black was not tested and the top plate was not milled to reduce the thickness at the weld. Also, varying tool RPMs were used as shown in Table 2 and two different tool traverse speeds were used, also as shown in Table 2. Additionally, members were anodized using a standard sulfuric acid anodization as is known in the art. (See also Military Specification Mil-A-8625).

FIG. 13 shows the custom-made gripping fixture 1300 used to hold both test specimens 210 and 211 for these tests. The test specimens 210 and 211 were gripped in three locations as shown in FIG. 13, with the weld nugget 318 located centrally between ear clamps 1306 as shown. However, unlike the arrangement used in Example 1, stationary clamp 1302 was used to secure structural member 211) in place during testing. The clamp 1302 was secured in place with two Grade 8 steel fasteners 1303 (one shown). The stationary clamp 1302 further has a stationary clamp threaded member 1304 for attachment to a load cell (not shown), which is a component of the servohydraulic test frame noted above, as is known in the art. The ear clamps 1306 were used to affix structural member 210 (the "top skin"). During this testing, the ear clamps 1306 were separated by a distance 1307 of about 3.7 cm (about 1.47 in). As noted above, each ear clamp 1306 was secured in place with two Grade 8 steel fasteners 1303 (one shown for each ear clamp 1306). Test specimen 210 rests on the clamping platen 1308 as described above. (The components of the gripping fixture 1300 can be altered and may vary during future testing. For example, the ear clamps 1306 may be separated a greater or lesser distance than distance 1307 shown in FIG. 13, the fasteners 1303 may be made from any suitable material other than Grade 8 steel, and so forth).

Figure 8:
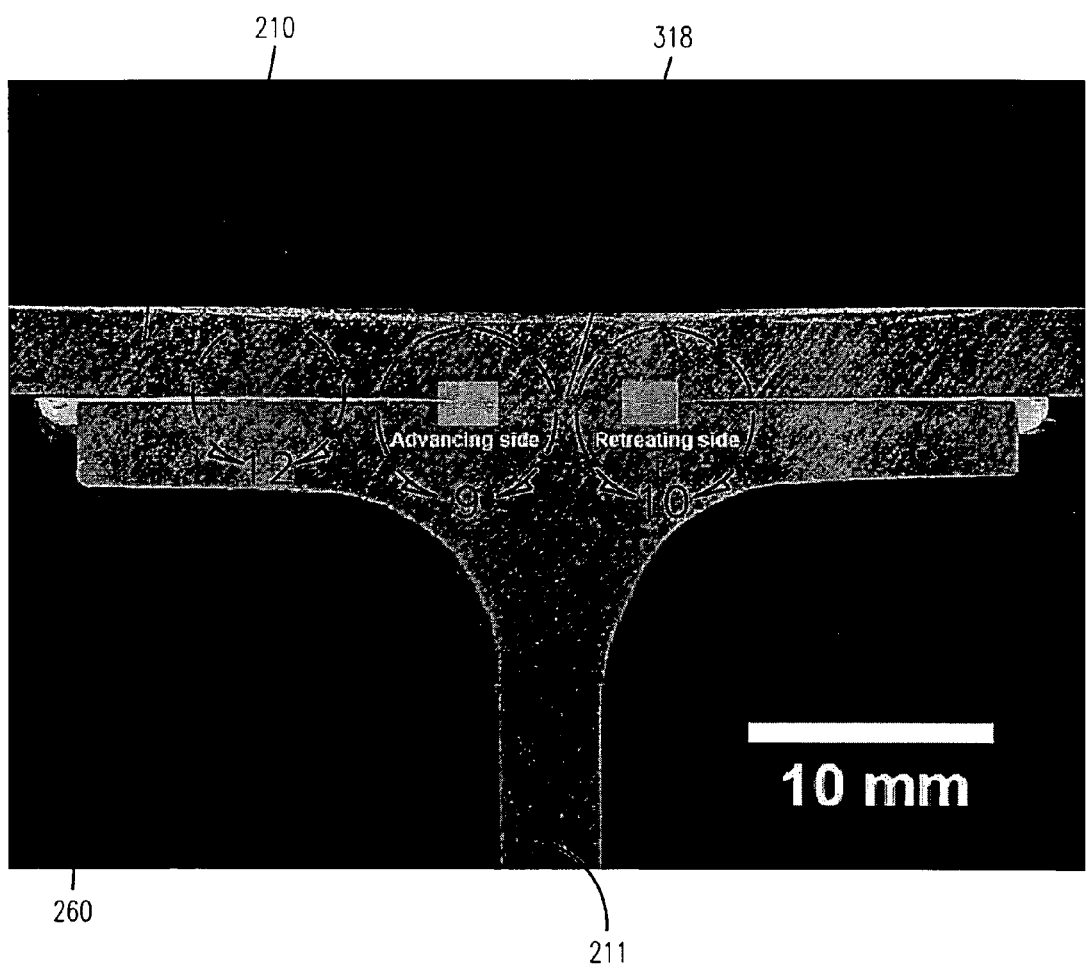
FIG. 8 is a photographic image of an anodized friction stir weld joint in one embodiment of the present invention.

FIG. 8 is a photographic image of the welded joint taken by the same type of camera and lens as described in Example 1, showing a weld nugget 318 between structural members 210 (anodized top skin), 211 (anodized T-substructure) containing sealant 260 (Corvel® White). Although not visible in these images, friction stir welding through the anodized aluminum leaves oxide debris on the retreating side of the weld nugget that is not otherwise present after friction stir welding of bare aluminum. The weld nugget 318 is located between the retreating side (shown in more detail in FIG. 9) and the advancing side (shown in more detail in FIG. 10). Sealant 260 was observed to fill the faying surface gaps on both sides of the weld nugget 318. However, there is little evidence of sealant intrusion into the weld nugget 318, and the force of the welding process appears to have displaced the sealant from the faying surfaces next to the weld nugget 318 on both the retreating (FIG. 9) and advancing (FIG. 10) sides of the weld, as no sealant is visible in FIG. 9 and only minimal sealant is visible in FIG. 10. Some voids were present in the sealant 260, but did not appear to be connected. The top skin anodization layer 902 and the T-substructure anodization layer 903 are visible in FIG. 9. These anodized layers are compressed together through the force of the friction stir welding process such that the sealant 260 was excluded and the gap 250 is nearly closed. Compressed anodized layers 902 and 903 are also visible in FIG. 10 adjacent to the weld nugget. Areas of porosity 1010 in the aluminum casting of member 211 are also apparent in FIG. 10, although these are common in such materials and do not affect the results herein.

Results:

The average results of testing on anodized aluminum with specimens containing sealant are summarized in Table 2 below:

TABLE 2

Summary of static tensile tests for friction stir welded T-Joints on anodized aluminum

| Tool Traverse Speed | Tool rpm | *Max Load kN/cm (lb/in) | *First Sealant failure kN/cm (lb/in) |
|---|---|---|---|
| 21.6 cm/min | 900 | 2.2 ± 0.17 (1240 ± 97) | 0.7 ± 0.23 (393 ± 130) |
| | 1000 | 2.1 ± 0.06 (1188 ± 37) | 0 to 0.93 (0 to 533) |
| | 1100 | 2.3 ± 0.09 (1315 ± 50) | 0 to 1 (0 to 575) |
| 25.4 cm/min. | 900 | 2.5 ± 0.02 (1583 ± 13) | no sealant |
| | 900 | 2.5 ± 0.07 (1436 ± 38) | no sealant |
| | 900 | 1.9 ± 0.08 (1092 ± 43) | 0 to 0.89 (0 to 510) |
| | 1000 | weld was not good | |
| | 1100 | 2 ± 0.16 (1149 ± 90) | 0 to 0.53 (0 to 303) |

*Uncertainty values were calculated as one sample standard deviation.

As Table 2 shows, the average maximum load for anodized aluminum with no sealant varied between sets of specimens. This is thought to be due to the variance in anodization thickness between samples, with higher levels of anodization corresponding with reduced maximum loads.

Figure 9:
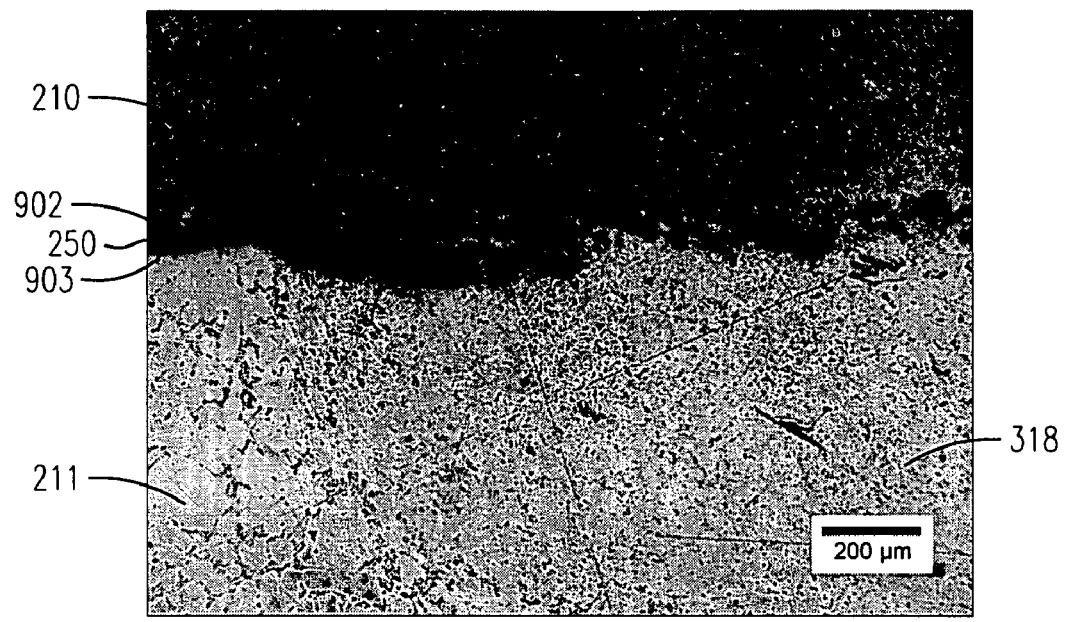
FIG. 9 is an enlarged microstructure image of a retreating side of the friction stir weld joint as indicated by section line 9 in FIG. 8 in one embodiment of the present invention.
Figure 10:
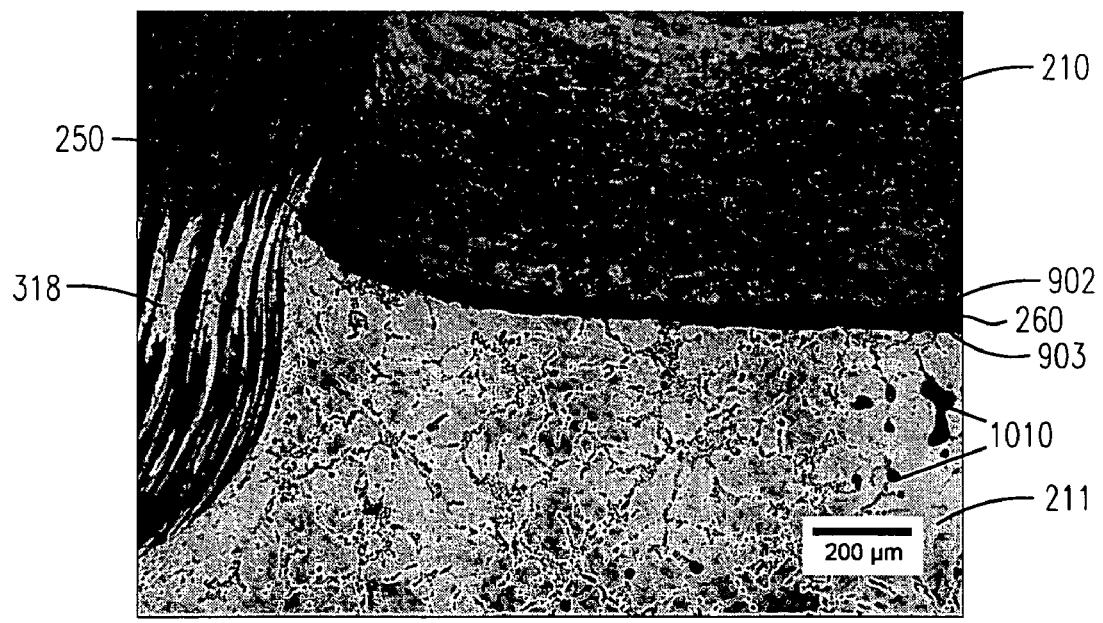
FIG. 10 is an enlarged microstructure image of an advancing side of the friction stir weld joint as indicated by section line 10 in FIG. 8 in one embodiment of the present invention.
Figure 11:
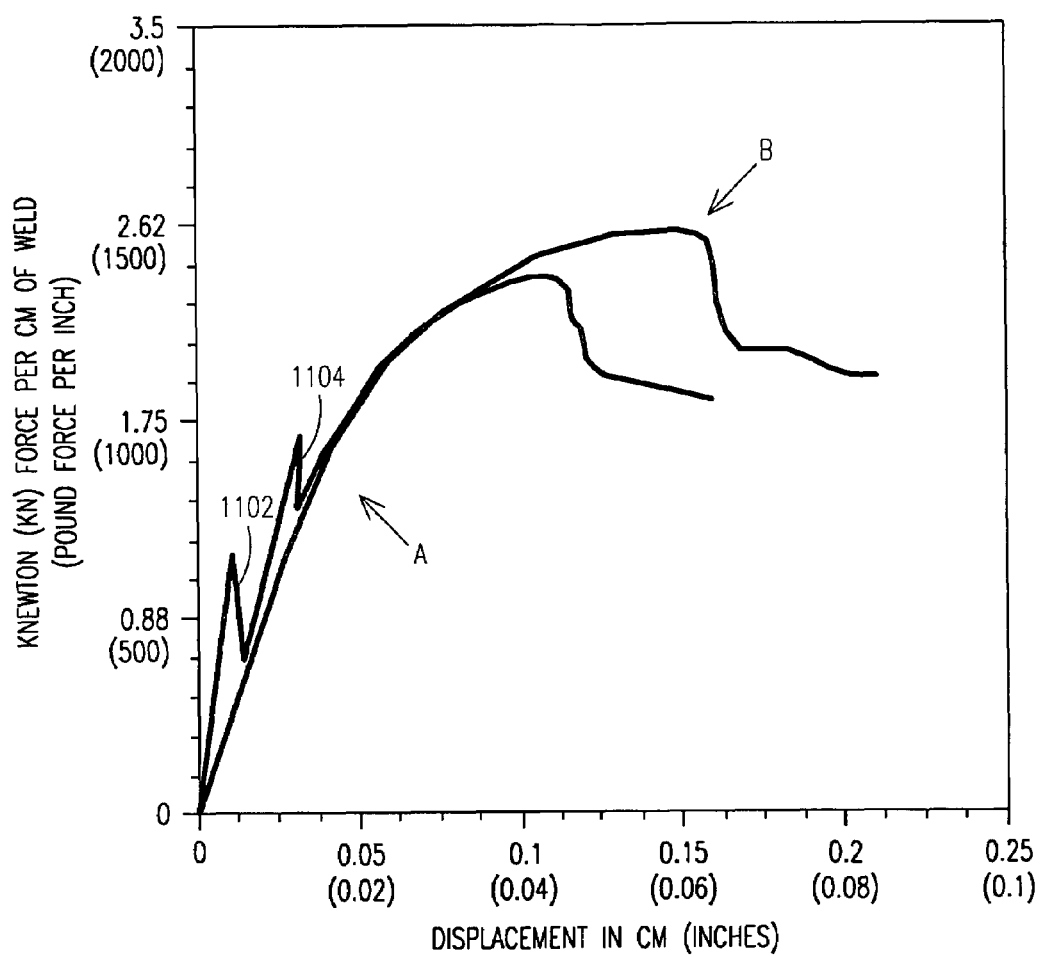
FIG. 11 is a plot showing force per distance of weld versus displacement for an anodized T-weld with and without sealant in one embodiment of the present invention.

A comparison of loading curves "A" and "B" for an anodized Corvel® White sealed joint and an anodized unsealed joint, respectively, is shown in FIG. 11. As FIG. 11 shows, the sealed joint (curve "A") has a greater stiffness, which is corroborated by the sudden load drop each time the sealant fails. Specifically, the first load drop 1102 corresponds with failure of the advancing side of the weld (such as is shown in FIG. 9). The second load drop 1104 corresponds with failure of the sealant on the retreating side of the weld. After the second load drop 1104, curves "A" and "B" essentially follow the same path. The test ends with the failure of the weld nugget itself.

Overall, however, these results are not as good as the results shown in FIG. 7 for bare aluminum. This is not surprising given the known adverse impact of anodization on ductility and strength of the welded joint. Additionally, there is some concern that use of a new gripping arrangement for the cast A357 T-substructure may have affected the results. It is possible that a slight bending moment on the weld made the load more severe on the stronger side, i.e., the advancing side. Additional testing as described in Example 3 appears to confirm this theory.

Figure 12:
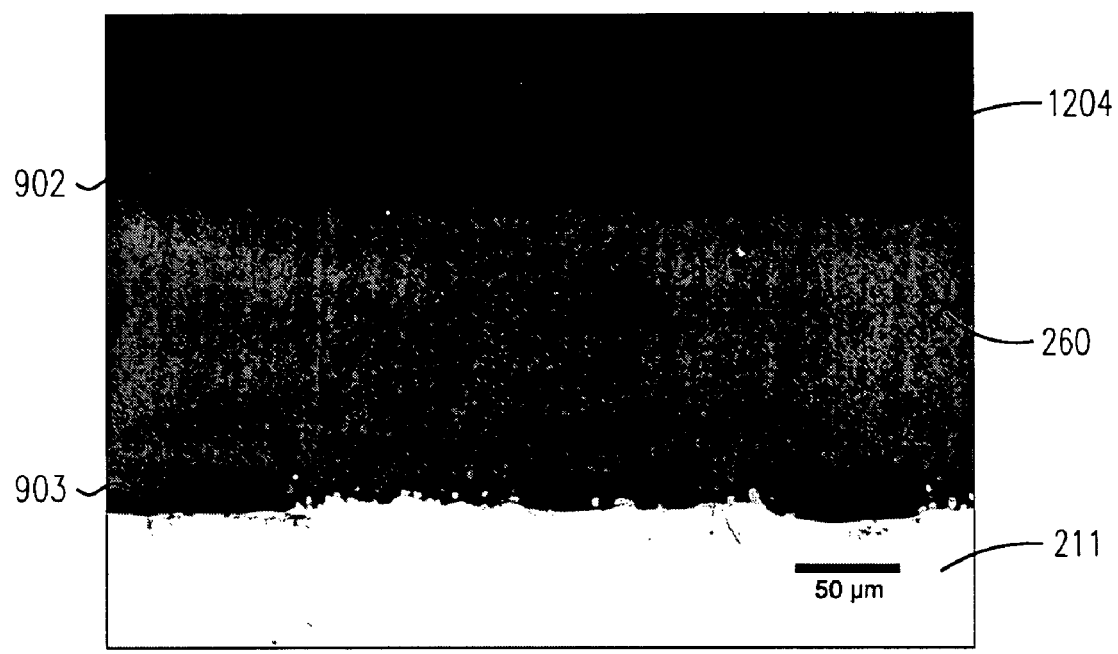
FIG. 12 is an enlarged microscopic image of another portion of the weld joint of FIG. 8 as indicated by section line 12 in FIG. 8 in one embodiment of the present invention.

FIG. 12 is an image taken where indicated in FIG. 8, i.e., to the far side of FIG. 9 (advancing side). FIG. 12 shows a portion of the T-substructure 211 after the mechanical test where the top skin 210 (not shown) was peeled away, causing failure of the seals and the weld nugget. The T-substructure anodization layer 903 can be seen on the bottom side of the sealant 260. Presence of the top skin anodization layer 902 on top of the sealant 260 indicates that the cause of the load drop (1102) shown in FIG. 11 was due to the separation of the top skin anodization layer 902 from the top skin member 210 (not shown), i.e., the top skin anodization layer 902 failed prior to the sealant 260 during these tests. Specifically, anodization decreases the load carrying capacity of the sealant, and therefore the amount of displacement to failure. FIG. 12 further shows an epoxy layer 1204 for mounting the surface for imaging.

EXAMPLE 3

The same starting materials, test procedures and equipment as described in Example 2 were used in Example 3, although all welding was done at 21.6 cm/min (about 8.5 in/min) with RPMs varying between 1000 and 1100 as shown in Table 3. Additionally, members were anodized using a standard sulfuric acid anodization as is known in the art. Again, Corvel® White was used as the sealant.

These tests sought to determine the relationship between the fixture 1300 and clamping of the advancing side and a determination of which side, i.e., advancing or retreating, failed first.

Results:

Table 3 provides the results of static tensile tests for friction stir welded T-joints on anodized aluminum:

TABLE 3

Summary of additional static tensile tests for friction stir welded T-Joints on anodized aluminum

| Tool rpm | *Max Load kN/cm (lb/in) | *First Sealant failure kN/cm (lb/in) |
|---|---|---|
| 1000 | 2.3 ± 0.13 (1298 ± 77) | 0.97 to 0.41 (552 ± 234) |
| 1100 | 2.3 ± 0.096 (1328 ± 55) | 0.79 ± 0.29 (453 ± 168) |

*Uncertainty values were calculated as one sample standard deviation.

The above values each represent average values from sixteen different specimens tested at two different RPMs. From each group of eight, four specimens were tested with the advancing side under one of the ear clamps and four were tested with the advancing side under the other ear clamp. During testing, it was noted which seal broke first and which clamping side broke first.

Relative to the clamping, 62.5% of the sixteen seals failed on one ear clamp first, again with half of the specimens tested with the advancing side under this ear clamp and half of the specimens with the advancing side under the other ear clamp. Thus, it appeared that alignment was relatively good. 75% of the weld seals failed on the retreating side first and 25% failed on the advancing side first, regardless of which ear clamp the advancing side was gripped with. Thus, it does appear that the retreating side is weaker than the advancing side. These results are consistent with what would be expected, since the weld nugget is known to be weaker on the retreating side.

These slightly improved tested results as compared with Example 2 are therefore thought to be due to improved alignment of the test structure shown in FIG. 13 with the various specimens tested. It is believed these results are more representative of the actual tensile strength of the specimens due to the improved test methods.

EXAMPLE 4

The same starting materials and test equipment as described in Example 3 were used in Example 4. Welding was performed with and without sealant to produce test specimens for cyclic fatigue tests. Welding parameters were chosen such that the static strength of the welded T-joint without sealant was the highest average value and the weld parameters for the T-joint with sealant produced the highest static strength for the first sealant failure. Again, Corvel® White was used as the sealant.

These tests sought to determine the relationship between the sealant and cyclic fatigue life of the welded T-joint. Fatigue tests were conducted using the gripping fixture shown in FIG. 13. Fatigue tests were conducted in load control where the mean load and cyclic amplitude were programmed to produce an R ratio of 0.1, i.e. minimum load divided by maximum load is equal to 0.1. The maximum load was set at 0.79 kN per cm of weld (450 lb/in) and cycled at approximately eight (8) Hz using a sinusoidal waveform. It was expected that some of the sealed joints would fail at the beginning of the test since the maximum load is close to the average reported in Table 3.

Results:

Table 4 provides the results of fatigue tests for friction stir welded T-joints on anodized aluminum:

TABLE 4

Summary of fatigue tests for friction stir welded T-Joints on anodized aluminum

| Tool Traverse Speed | Tool rpm | *Number of Cycles to Failure |
| --- | --- | --- |
| Without sealant | | |
| 25.4 cm/min. | 900 | 103,000 ± 32,500 |
| With sealant | | |
| 21.6 cm/min | 1000 | 203,000 ± 83,800 |

*Uncertainty values were calculated as one sample standard deviation.

The above values each represent average values. There were eight specimens tested that were welded without sealant and nine specimens that were welded with sealant. During testing, it was noted that more than 50% of the specimens with sealant had a sealant failure either on the advancing side or the retreating side during the first 1000 cycles. In one test, the sealant remained intact for more than 65,000 cycles and that specimen failed after 299,000 cycles.

The improved fatigue life of the welded T-joints containing the sealant is believed to result from the sealant bonding the faying surfaces together which increases the stiffness of the joint and reduces the opening of the faying surface gap 250 next to the weld nugget.

CONCLUSION

Nylon-11 appears to be an effective sealing agent for friction stir welded lap joints, although the invention is not so limited. It is likely that other nylons, as well as other thermoplastics, will perform at least as well, if not better. However, the low concentration of unsaturated bonds present in certain thermoplastics (such as nylon-11) may be desirable in limiting cross-linking during exposure to ultraviolet radiation. Additional testing can determine the effect of unsaturated bond concentration on cross-linking, as well as the correlation between sealant strength and friction stir welding parameters. In other embodiments, welding other than friction stir welding may be used. In yet other embodiments, means for joining two surfaces together, other than welding, may also be used in combination with the thermoplastic sealants described herein.

Although testing herein was performed with plasma spraying, it is expected that electrostatic spraying will provide for increased control in application of the sealant. Additional testing with tapes and other means of disposing the sealant may also be performed.

The thermoplastic sealants described herein have excellent static and fatigue properties at room temperature. They provide excellent corrosion control at minimal cost and environmental impact. Unless conductive fillers are added as an option to provide a desired feature, the sealants are chemically inert relative to the corrosion of the metallic structure and therefore do not induce galvanic corrosion. The sealants do not undergo a "curing" step or room temperature vulcanization, thus providing flexibility during the manufacturing process as to the timing of sealant application and welding. Additionally, there is minimal to no adverse impact on the strength of the welding joint with use of these sealants, and the sealed joints actually exhibit a higher joint stiffness as compared with a welded joint having no sealant, thus possibly protecting the weld nugget itself from fatigue damage. The sealants are also repairable as needed. The sealants may be even further optimized with additional surface preparation, addition of fillers to provide a desired property, adjustment of weld parameters, and so forth. Additionally, copolymerization or blending of multiple types of thermoplastics, or a combination of copolymerization and blending, may provide additional advantages. For example, a higher temperature sealant may be obtained by blending nylon-11 with nylon 6/6. Similarly, improved ductility or low temperature properties may be enhanced by the addition of polyethylene or a plasticizer to nylon-11.

Many modifications and other embodiments of the invention set forth herein will come to mind to one skilled in the art to which this invention pertains, having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A joint usable for aeronautical and aerospace structures comprising:
   at least one metallic structural member defining first and second faying surfaces in an opposed configuration and defining an interface therebetween, the interface containing one or more spaces;
   a weld nugget area extending through the interface and connecting the first and second faying surfaces of the at least one structural member, wherein the one or more spaces are located on either side of the weld nugget area; and
   an adhesive bond located proximate to the weld nugget area in the one or more spaces of the interface, wherein the adhesive bond comprises a thermoplastic sealant having a melting temperature lower than a melting temperature of the at least one structural member wherein the sealant is chemically inert relative to the corrosion of the at least one metallic structural member, does not induce galvanic corrosion and does not undergo a curing step or room temperature vulcanization during manufacture of the joint.

2. The joint of claim 1 wherein the adhesive bond improves fatigue life of the joint as compared to a joint having only a weld nugget area by bonding the first and second faying surfaces together to increase stiffness of the joint and by reducing a faying surface gap opening next to the weld nugget area.

3. The joint of claim 1 wherein the polyamide is nylon.

4. The joint of claim 3 wherein the nylon is nylon-11.

5. The joint of claim 1 wherein the thermoplastic sealant contains one or more fillers.

6. The joint of claim 5 wherein the one or more fillers comprise amorphous silica.

7. The joint of claim 5 wherein the one or more fillers are selected from plasticizers, glass fibers, coloring additives, and combinations thereof.

8. The joint of claim 1 wherein the joint is a lap joint.

9. The joint of claim 1 comprising two metallic structural members.

10. The joint of claim 1 comprising two structural members, each made from a different metal.

11. The joint of claim 1 herein the at least one structural member comprises first and second substantially parallel members defining the first and second faying surfaces respectively, wherein the joint extends in a substantially perpendicular direction through the interface of the first and second faying surfaces.

12. The joint of claim 11 wherein the second substantially parallel member has a T-substructure.

13. The joint of claim 1 wherein the thermoplastic sealant is a polyamide, polyimide, polyetheretherketone, polyphenylene sulfide, polyether sulfone, polyamideimide, polyphenylene oxide, or any combination thereof.

* * * * *